United States Patent
Stoss

[11] Patent Number: 5,600,686
[45] Date of Patent: Feb. 4, 1997

[54] METHOD FOR REPLACING A COMPONENT LOCATED IN THE INTERIOR OF A CONTAINMENT OF A NUCLEAR REACTOR

[75] Inventor: Johannes Stoss, Erlangen, Germany

[73] Assignee: Siemens Aktiengesellschaft, Munich, Germany

[21] Appl. No.: 515,828

[22] Filed: Aug. 16, 1995

[30] Foreign Application Priority Data

Aug. 16, 1994 [DE] Germany .................. 44 29 012.8

[51] Int. Cl.⁶ .................................................. G21C 19/20
[52] U.S. Cl. ............................................................ 376/260
[58] Field of Search ..................................... 376/260, 249

[56] References Cited

U.S. PATENT DOCUMENTS

| | | | |
|---|---|---|---|
| 4,036,687 | 7/1977 | Rickard et al. | 376/260 |
| 4,299,656 | 11/1981 | Weber et al. | 376/249 |
| 4,666,050 | 5/1987 | Krieger et al. | 376/260 |
| 4,847,038 | 7/1989 | Martin | 376/260 |
| 5,404,382 | 4/1995 | Russ et al. | 376/260 |

FOREIGN PATENT DOCUMENTS

| | | |
|---|---|---|
| 1764803 | 5/1972 | Germany . |
| 2833763 | 2/1980 | Germany . |
| 3142500 | 5/1983 | Germany . |

OTHER PUBLICATIONS

Publication: "VGB Kraftwerkstechnik" 71 (1991), No. 8, pp. 788–791 (Beaujean et al.).

Primary Examiner—Daniel D. Wasil
Attorney, Agent, or Firm—Herbert L. Lerner; Laurence A. Greenberg

[57] ABSTRACT

A method for replacing a component located in the interior of a containment of a nuclear reactor includes forming an opening in a dome of the containment above the component to be replaced, for transporting the component through the opening. In one embodiment, an unsupported work scaffold is suspended from the dome, for handling at the dome. In another embodiment, a work scaffold is suspended from support cables of a hoisting tackle disposed outside the containment and the support cables are guided through passageway openings in the dome, for handling at the dome.

5 Claims, 5 Drawing Sheets

5,600,686

METHOD FOR REPLACING A COMPONENT LOCATED IN THE INTERIOR OF A CONTAINMENT OF A NUCLEAR REACTOR

BACKGROUND OF THE INVENTION

FIELD OF THE INVENTION

The invention relates to a method for replacing a component located in the interior of a containment of a nuclear reactor.

Replacing a large component, such as a steam generator, which is located in the interior of a containment is possible only if the containment is provided with an opening of suitable size. That requires extensive preparation work and corresponding work afterward. It would be desirable if the down time of the nuclear power plant required for the replacement could be made usable for other inspection work as well. In order to make that possible, it must be assured that the work required for dismantling the component will interfere as little as possible with the work procedures of the other inspection work and will allow unhindered access to crane devices which are permanently installed in the containment.

For instance, it is known from the publication "VGB Kraftwerkstechnik" 71 (1991), No. 8, pp. 788–791, to transport a steam generator through a lateral installation opening of the containment of a reactor building. However, in that kind of procedure the polar crane which is permanently installed in the containment is no longer usable, so that during the work of replacing the steam generator it is unavailable for other inspection work.

SUMMARY OF THE INVENTION

It is accordingly an object of the invention to provide a method for replacing a component located in the interior of a nuclear reactor containment, which overcomes the hereinafore-mentioned disadvantages of the heretofore-known methods of this general type and with which hindrance to other inspection work can be avoided as much as possible.

With the foregoing and other objects in view there is provided, in accordance with the invention, a method for replacing a component located in the interior of a containment of a nuclear reactor, which comprises forming an opening in a dome of a containment of a nuclear reactor above a component to be replaced in the interior of the containment, for transporting the component through the opening; and suspending an unsupported work scaffold from the dome, for handling at the dome.

With the objects of the invention in view, there is also provided a method for replacing a component located in the interior of a containment of a nuclear reactor, which comprises forming an opening in a dome of a containment of a nuclear reactor above a component to be replaced in the interior of the containment, for transporting the component through the opening; and suspending a work scaffold from support cables of a hoisting tackle disposed outside the containment and guiding the support cables through passageway openings in the dome, for handling at the dome.

The methods according to the invention are advantageous especially in nuclear power plants having a containment which is disposed in the interior of a cylindrical concrete shell that is open at the top, since replacement of the component through the top does not require any intervention into the concrete shell through the containment dome.

The process according to the invention moreover assures that a polar crane required for other work during the steam generator replacement will not be blocked.

In accordance with another mode of the invention, there is provided a method which comprises lifting a support device having a hoisting tackle for the work scaffold with support cables of a hoisting tackle disposed outside the containment, and suspending the unsupported support device from the dome.

In accordance with a concomitant mode of the invention, there is provided a method which comprises parking the work scaffold below the opening on a parking device disposed above the component.

DESCRIPTION OF THE PREFERRED EMBODIMENTS

Figure 1:
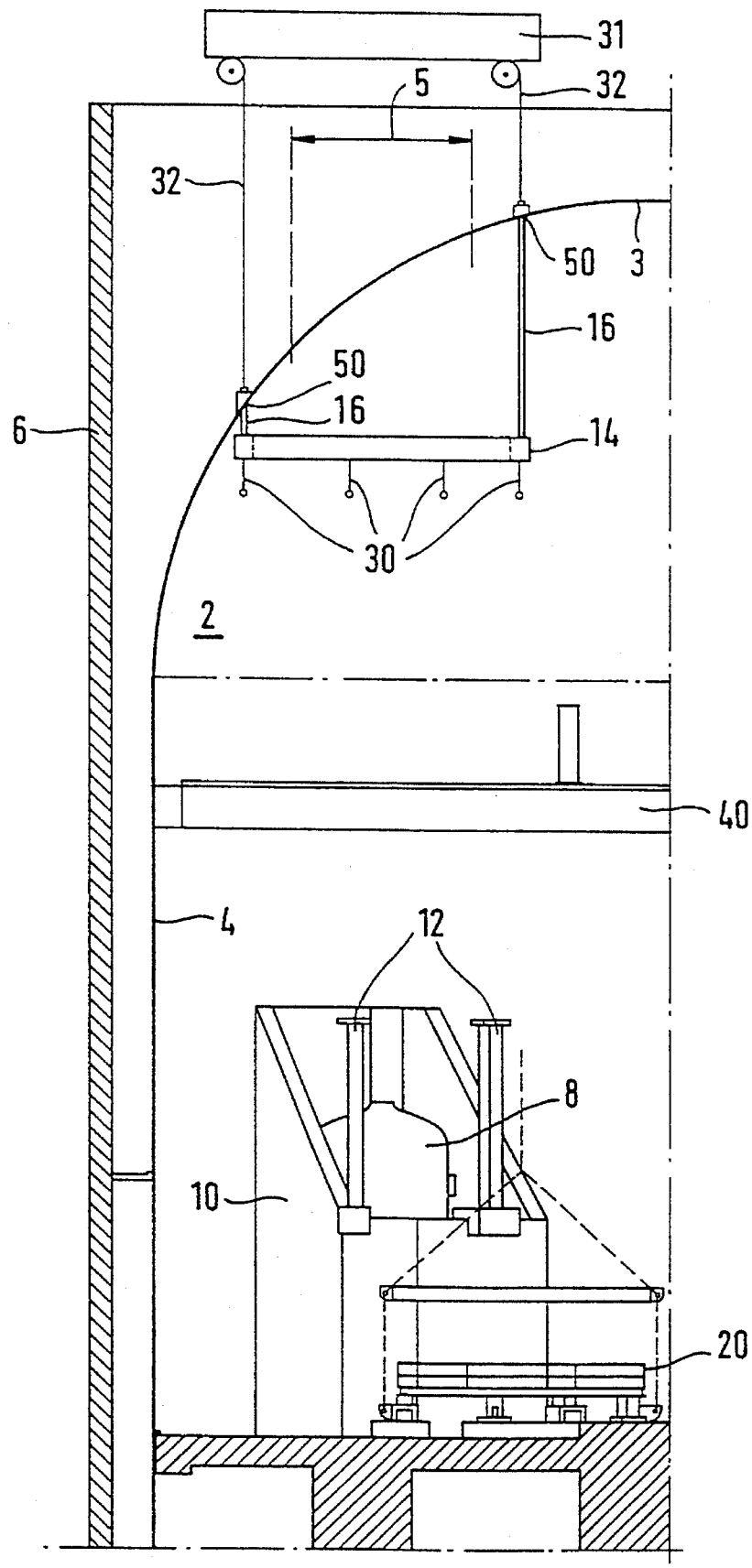
FIGS. 1, 2, 3 and 5 are fragmentary, diagrammatic, sectional views

Referring now to the figures of the drawing in detail and first, particularly, to FIG. 1 thereof, there is seen a steel containment 2 which includes a dome 3 and a cylindrical portion 4. The containment 2 is surrounded by a cylindrical concrete shell 6 that is open at the top. A component 8 to be replaced, which is a steam generator in the exemplary embodiment, is located inside the containment 2 in a protective housing 10, for instance a steam generator house, that is open at the top.

An opening 5 must be cut in the dome 3, so that the component 8 can be lifted upward out of the containment 2 through the opening 5.

A support device 14 with a hoisting tackle for support ropes 30 is disposed below the region intended for the opening 5. The support device 14 is anchored in the dome 3 for this purpose through retaining rods 16, which protrude through bores 50 in the dome 3, and is suspended, unsupported, in the containment 2. The support device 14 has been lifted in a preceding work step with a hoisting tackle 31 disposed outside the containment 2, using support cables 32 guided through the bores 50.

A parking device 12 is installed on the steam generator house 10. A work scaffold 20, which is parked on the floor and prepared, is lifted onto the parking device 12 with a polar crane that is permanently installed in the containment and can be driven along an annular rail 40.

Figure 2:
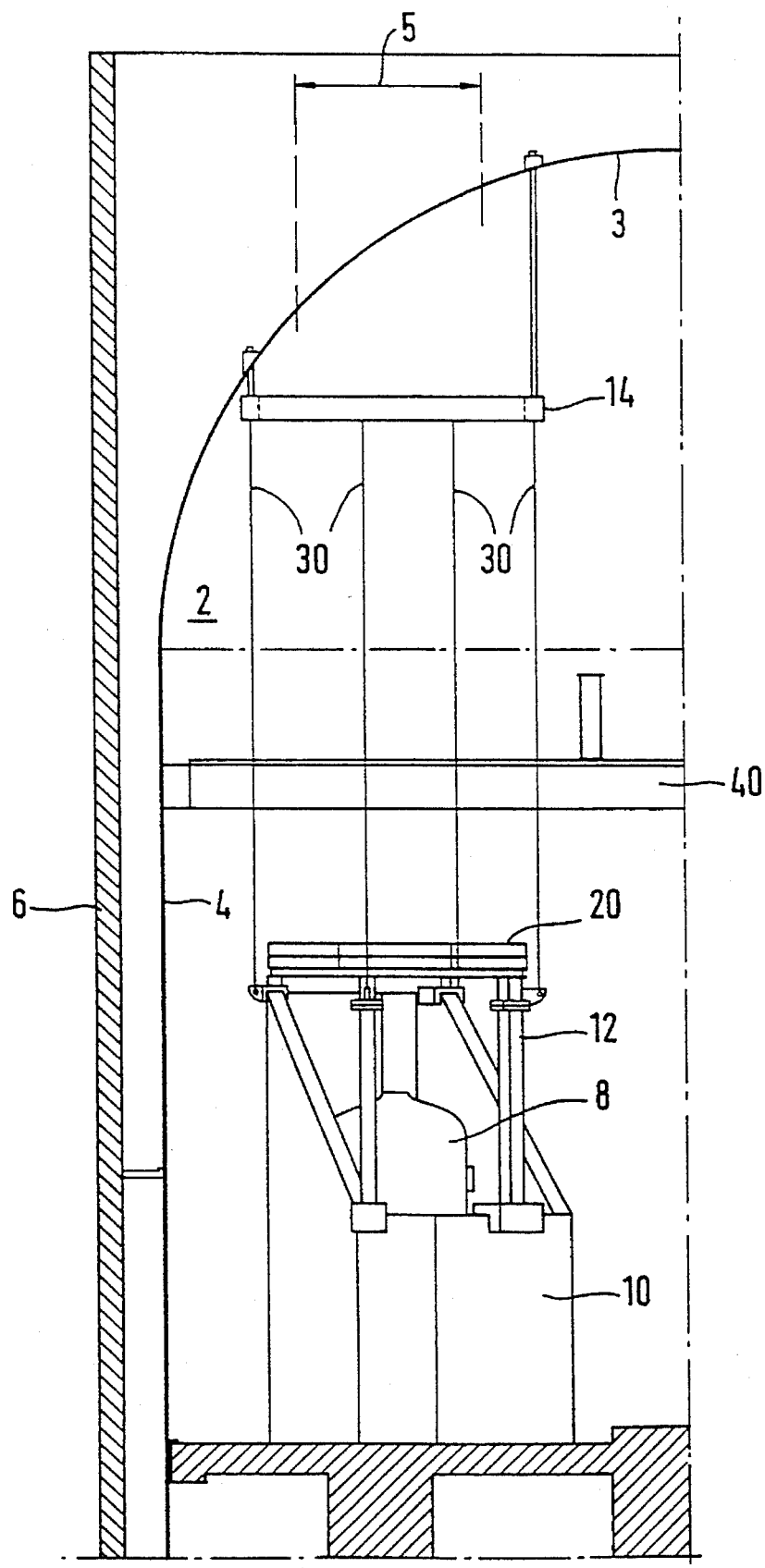
Figure 3:
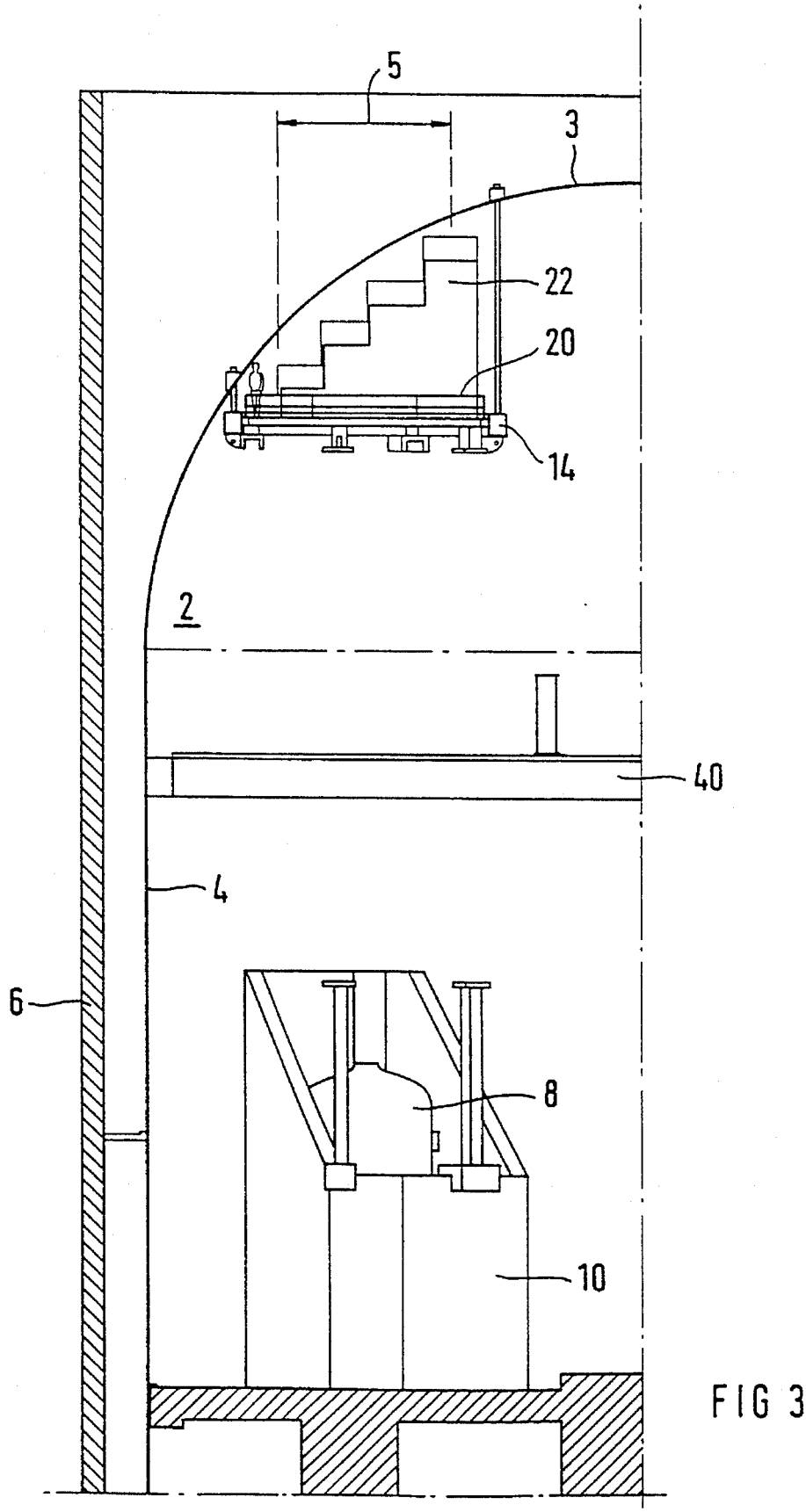

FIG. 2 shows the work scaffold 20 parked on the parking device 12. The work scaffold 20 can then be lifted by the support ropes or cables 30 of the support device 14 and secured to the dome 3 on the support device 14 for the duration of the work, as is shown in FIG. 3. It can also be seen in this drawing figure that the work scaffold 20 includes a telescoping work platform 22, which compensates for the variable distance between the dome 3 and the base of the work scaffold 20. Hindrance to other work for which the polar crane is required exists only during the time that the work scaffold 20 is raised and lowered and is thus limited to very brief periods of time.

Figure 4:
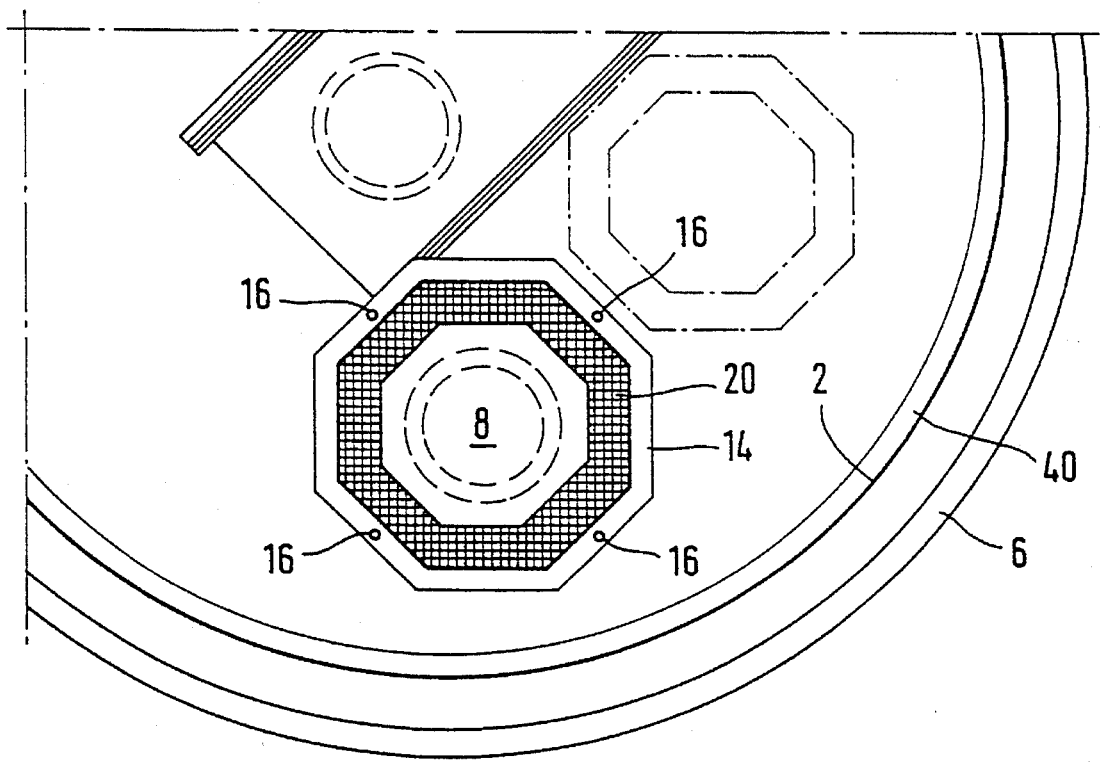
FIG. 4 is a fragmentary, plan view of a containment of a nuclear power plant, with the aid of which the methods according to the invention will be described in further detail below.

It can be seen from the plan view of FIG. 4 that the work platform 20, like the support device 14, has an annular construction, the inside diameter of which is greater than the diameter of the component 8 to be replaced.

After the dome 3 has been opened, the component 8 that is to be replaced is then lifted out of the containment to the outside through a hoisting tackle which is disposed outside the containment 2 and is not visible in the drawing.

Figure 5:
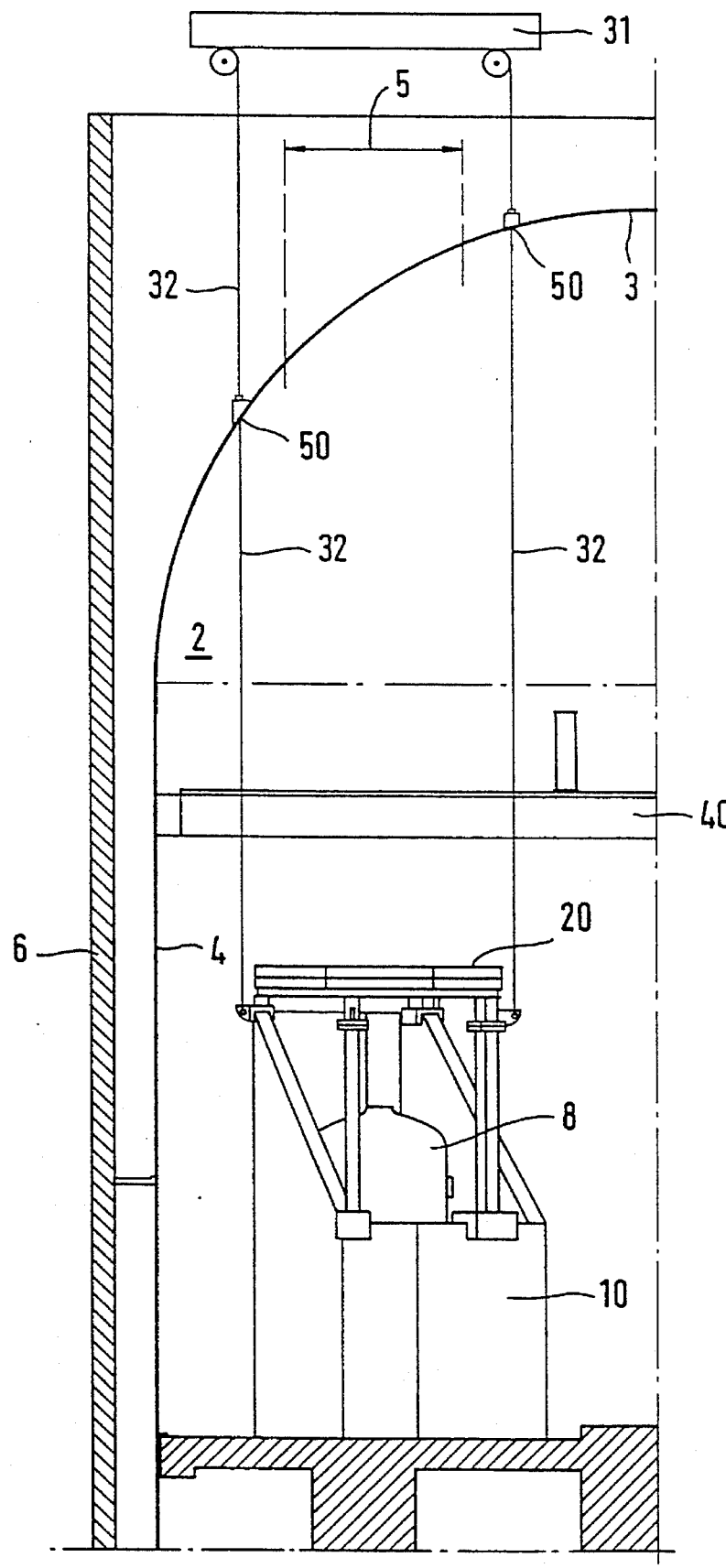

The exemplary embodiment of FIG. 5 shows a simplified variant, in which instead of a hoisting tackle fixed to a support device inside the containment 2, only the hoisting tackle 31 installed outside the containment 2 is utilized. The hoisting tackle 31 moves the work scaffold 20 back and forth between a work parking position and a working position directly through the wire cables 32 that are guided into the containment 2 through the bores 50.

I claim:

1. A method for replacing a component located in the interior of a containment of a nuclear reactor, which comprises:

forming an opening in a dome of a containment of a nuclear reactor above a component to be replaced in the interior of the containment, for transporting the component through the opening; and suspending an unsupported work scaffold from the dome, for handling at the dome.

2. A method for replacing a component located in the interior of a containment of a nuclear reactor, which comprises:

forming an opening in a dome of a containment of a nuclear reactor above a component to be replaced in the interior of the containment, for transporting the component through the opening; and suspending a work scaffold from support cables of a hoisting tackle disposed outside the containment and guiding the support cables through passageway openings in the dome, for handling at the dome.

3. The method according to claim 1, which comprises lifting a support device having a hoisting tackle for the work scaffold with support cables of a hoisting tackle disposed outside the containment, and suspending the unsupported support device from the dome.

4. The method according to claim 1, which comprises parking the work scaffold below the opening on a parking device disposed above the component.

5. The method according to claim 2, which comprises parking the work scaffold below the opening on a parking device disposed above the component.

* * * * *